May 15, 1951     T. J. COTTON, JR     2,553,512
GAS TURBINE APPARATUS

Filed Aug. 22, 1949     2 Sheets-Sheet 1

WITNESSES:
John M. Wright
D. J. McCarty

INVENTOR
THOMAS J. COTTON JR.
BY
ATTORNEY

May 15, 1951　　　T. J. COTTON, JR　　　2,553,512
GAS TURBINE APPARATUS

Filed Aug. 22, 1949　　　　　　　　　　　2 Sheets-Sheet 2

WITNESSES:
John M. Wright
D. J. McCarty

INVENTOR
THOMAS J. COTTON JR
BY
A. B. Reavis
ATTORNEY

Patented May 15, 1951

2,553,512

UNITED STATES PATENT OFFICE 2,553,512

GAS TURBINE APPARATUS

Thomas J. Cotton, Jr., Santa Monica, Calif., assignor, by mesne assignments, to the United States of America as represented by the Secretary of the Navy Application August 22, 1949, Serial No. 111,636

5 Claims. (Cl. 183—62)

This invention relates to aviation power plant equipment and more particularly to an air inlet screen structure for an aviation power plant.

It is a principal object of the invention to provide screen or guard structure, functioning while an aircraft is flying at low altitude, for preventing access of foreign bodies, such as birds, to the ram air inlet passage or duct which leads from a leading wing or other surface of the aircraft through the wing or fuselage to a power plant located rearwardly of the duct entrance.

Another object of the invention is the provision of yieldably mounted screen apparatus serving to protect the frontal atmospheric opening of the air inlet duct for an aircraft power plant, which screen apparatus is adapted to permit temporary deformation thereof in case of violent collision with a foreign object, the construction being such as to prevent failure of the screen and to ensure subsequent restoration of the normal contour of the apparatus.

A further object is to provide flexible screen apparatus of the above description which may readily be retracted to an inoperative position when desired.

A feature of the invention is the utilization, in association with screen apparatus of the above type, of structural elements formed of a resilient material having a high impact energy absorption characteristic, or ability to elongate at approximately a constant draw load without rupture, for example, undrawn nylon.

These and other objects are effected by the invention as will be apparent from the following description and claims taken in connection with the accompanying drawings, forming a part of this application, in which:

Figure 1:
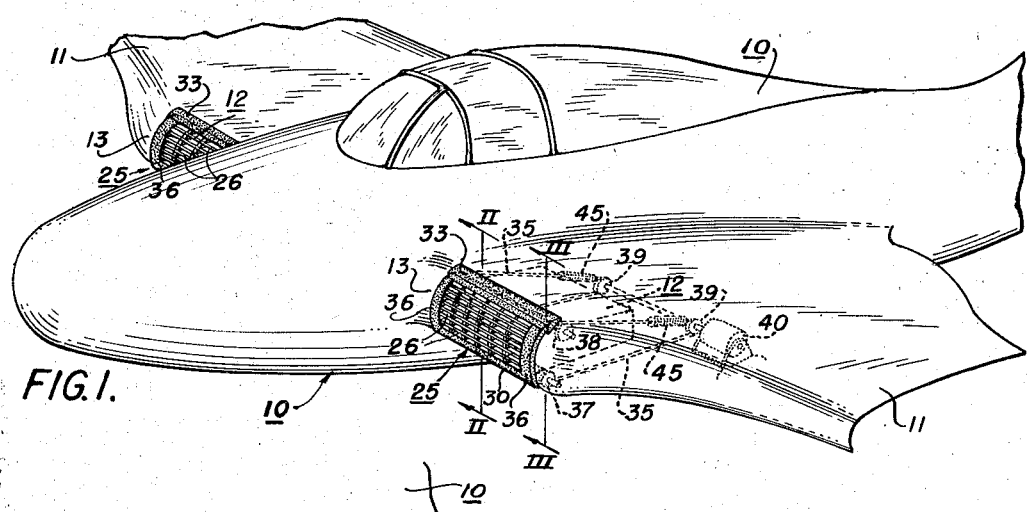
Fig. 1 is a schematic, perspective view of an aircraft having air inlet passages and equipped with retractile screen apparatus constructed in accordance with the invention.
Figure 2:
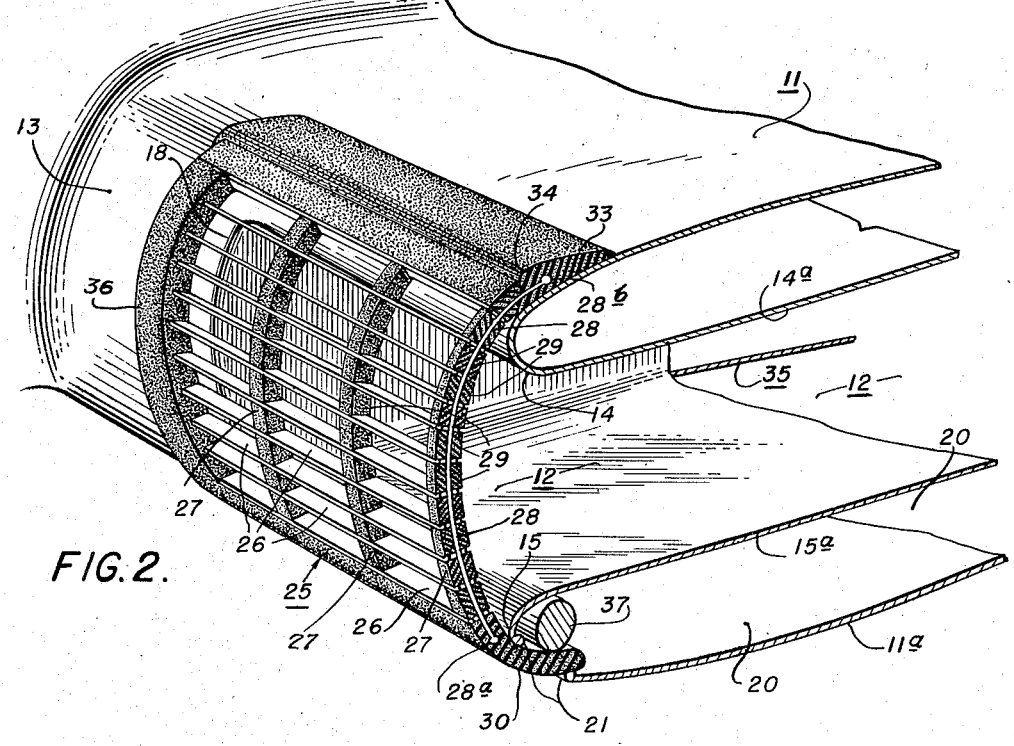
Fig. 2 is a fragmentary perspective view of the screen apparatus shown in Fig. 1, enlarged in detail and sectioned substantially along the line II—II thereof.

Illustrated in Fig. 1 of the drawings is an aircraft 10 having wings 11 in which are formed suitable air inlet ducts 12, which open forwardly in rounded airfoil walls 13 of the wings and are adapted to supply air by ram to one or more power plants (not shown), preferably of the well known aviation gas turbine class although the invention is equally applicable to athodyd power plants. As best shown in Fig. 2, the mouth of each duct 12 is generally rectangular and is defined by parallel upper and lower rounded wall surfaces 14 and 15 of the wing structure 11, and by arcuate side wall surfaces including that indicated at 18 (Fig. 2), the latter surfaces having edges following the airfoil contour of the frontal wall 13. As shown in Fig. 2 the wing structure further includes an upper interior wall 14a and a lower interior wall 15a, the latter of which is spaced from the lower outer wall 11a of the wing structure to form a generally horizontal chamber 20 terminating in a forwardly opening slot 21.

According to the invention, a flexible retractile guard or screen assembly 25 is provided for movement into or out of protective relation with each of the ducts 12, for preventing access thereto of foreign objects, which might otherwise be drawn into and damage the associated power plant. Referring to Fig. 2, the screen assembly 25 comprises a plurality of longitudinally-disposed metal slats or vanes 26, which are spaced apart and bound in assembled relation by a number of flexible web members 27 disposed intermediate the ends of the vanes and aligned normal thereto. Each of these web members may consist of a cable 28 and associated spacers 29 formed of a suitable rubber composition or yieldable plastic material of a type adapted to be bonded to the metal vanes and wires. Bonded or otherwise secured to the lower vane 26 is a flexible extension or web portion 30 of the screen assembly, which may be formed of a rubber or other composition similar to that of which the spacers 29 are made. The web portion 30 serves as a medium in which the enlarged heads 28a of the cables 28 are anchored, and is also adapted to ride over the curved surface 15 into closing relation with the slot 21 when the screen assembly 25 is in the normal position, as shown in Fig. 2. A somewhat similar flexible web portion 33 is provided for supporting the upper end of the screen assembly and for anchoring the enlarged ends 28b of the wires 28. An elevated rib 34 is formed on the web portion 33 for engagement with the lower lip of the slot 21 to limit movement of the screen assembly to the retracted position illustrated in Fig. 4 of the drawings, as hereinafter more fully explained. In this position the web portion 33 also serves as a closure for the slot 21.

For supporting the screen assembly in operative relation within the wing structure 11, there are provided two oppositely disposed endless cable assemblies 35 (see Fig. 1), which are in part embedded in flexible end web portions 36 formed integral with or secured to the lower and upper web portions 30 and 33. The cable assemblies 35 and web portions 36 are cooperative with a roller 37 and with spaced pairs of pulleys 38 and 39 carried within the wing structure, and are arranged to be operated by a suitable actuator motor 40 associated with the pulleys 39.

Figure 3:
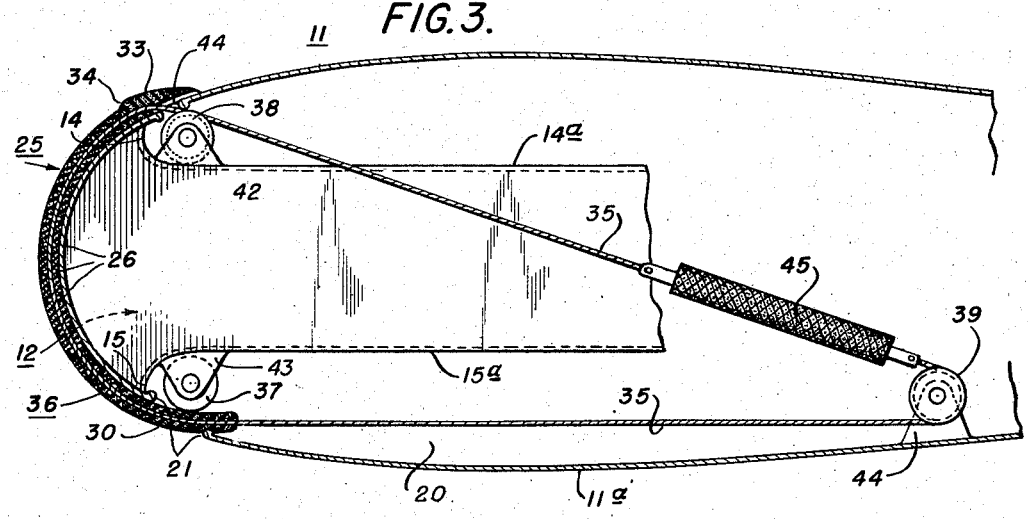
Fig. 3 is a fragmentary enlarged-detail sectional view taken substantially along the line III—III of Fig. 1.

As best shown in Fig. 3, wherein one of the two cable assemblies 35 is illustrated in enlarged detail, each pulley 38 is rotatably mounted on a bracket 42 carried by the wall 14a of the wing structure, and is spaced above the roller 37, which is rotatably mounted on a pair of brackets 43 carried by the wall 15a. The roller 37 and the two coaxial pulleys 38 are thus disposed on opposite sides of the duct opening 12. The pulleys 39 may be rotatably mounted on a common drive shaft which is journaled on brackets 44 supported on the lower wall 11a of the wing structure at a point remote from the duct opening 12. Each cable assembly 35 is mounted in taut relation with respect to the pulleys 39 and 38 and the roller 37, the curved wall 13 serving to track the portion of each cable assembly, or the flexible screen assembly 25 carried thereby, when passing in front of the opening of the duct 12. Openings 44 are provided in the frontal wall 13 of the wing structure for receiving the portions of the respective cable assemblies adjacent the pulley 38.

According to the invention, each endless cable assembly 35 includes an enlarged elastic section 45, which is formed of a suitable plastic material characterized by the ability to elongate 50% or more for absorption of impact energy under a constant draw load without rupture, such as undrawn synthetic polymeric amide, or undrawn nylon. The elastic section 45 is preferably disposed between the pulleys 38 and 39 and is adapted to traverse the distance therebetween when the apparatus is actuated for shifting the screen assembly from one position to the other.

From the foregoing it will now be seen that with the cable assemblies 35 positioned as shown in Fig. 3, to maintain the flexible screen assembly 25 in the normal or protective position in front of the mouth of the duct 12, upon forceful collision of a foreign object with the screen assembly the elastic sections 45 will be elongated to absorb the blow, allowing part of the screen assembly to be yieldingly driven temporarily into the duct 12 to a limited extent, while resisting rupture of any part of the apparatus.

Figure 4:
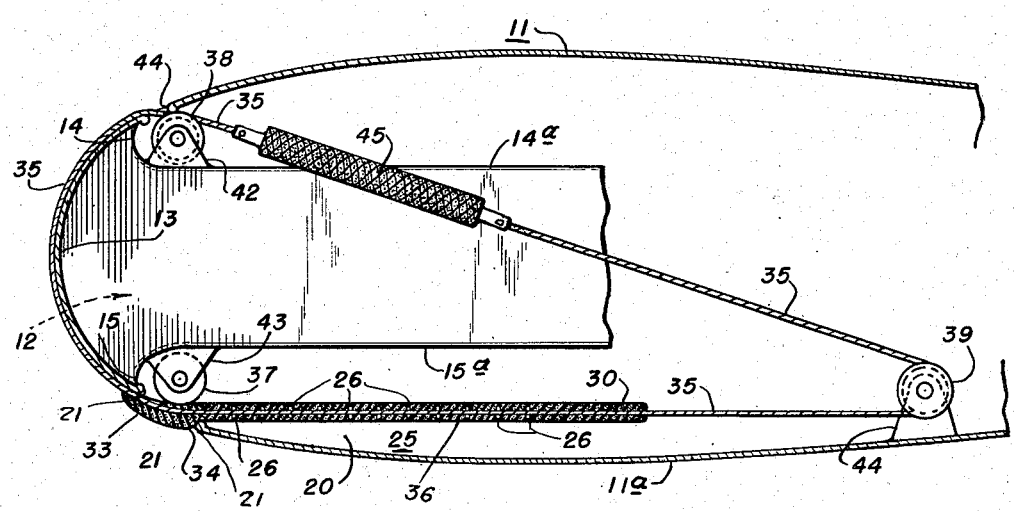
Fig. 4 is a view similar to Fig. 3 illustrating the screen apparatus in a retracted or inoperative position.

If desired, the motor 40 (see Fig. 1) can be operated to actuate the cable assemblies to retract the screen 25 into its inoperative position within the chamber 20, as shown in Fig. 4, for freeing the duct of all flow interference, during high altitude operation for example, when the danger of encountering foreign objects is a minimum. The screen and its actuating mechanism are then entirely contained within the wing structure 11 to avoid any adverse drag effect.

While the invention has been shown in but one form, it will be obvious to those skilled in the art that it is not so limited, but is susceptible of various changes and modifications without departing from the spirit thereof.

What is claimed is:

1. In an aircraft having wall structure forming an air inlet duct, yieldable guard apparatus for preventing access of foreign objects into said air inlet duct comprising a plurality of spaced rotary elements mounted in said wall structure adjacent said inlet duct, a movable flexible screen assembly comprising spaced yieldable web and vane elements normally disposed in spanning relation over the mouth of said duct, a plurality of cables having portions secured to opposite ends of said screen assembly and operatively mounted on said rotary elements, and a plurality of elastic elements connecting the ends of said cables, respectively, each of said elastic elements serving normally to maintain said cables taut and being adapted to absorb impact forces tending to elongate said cables incident to collision of a foreign object with said screen assembly.

2. In an aircraft having wall structure forming an air inlet duct, yieldable guard apparatus for preventing access of foreign objects into said air inlet duct comprising a plurality of spaced rotary elements mounted in said wall structure adjacent said inlet duct, a movable flexible screen assembly comprising spaced yieldable web and vane elements normally disposed in spanning relation over the mouth of said duct, a plurality of cables having portions anchored in opposite ends of said screen assembly and operatively engaging said rotary elements, and means operatively connected to one of said rotary elements for effecting movement of said cables for retracting said screen assembly away from the mouth of said duct.

3. Airfoil structure having an air inlet opening and an adjacent recess formed therein, a plurality of rollers mounted in said structure at points spaced about the margin of said opening, a plurality of spaced cables operatively mounted on associated groups of said rollers, a retractile screen assembly carried by said cables and movable either to a normal position in spanning relation with said opening or to an inoperative position within said recess, said screen assembly comprising a plurality of spaced parallel vanes and carrier web members therefor formed of a flexible material, and actuating means operative through the medium of said cables to effect movement of said screen assembly between said normal and inoperative positions.

4. Apparatus as set forth in claim 3, wherein spaced motion-limiting stop portions are carried by the screen assembly for cooperation with the airfoil structure adjacent the air inlet opening to prevent excessive travel of the screen assembly during movement to the respective normal and inoperative positions.

5. In aviation air ducting equipment for supplying air to a power plant, frame structure forming an air duct having a ram inlet, said frame structure including parallel frontal tracking walls disposed at opposite sides of the inlet of said duct, a yieldable screen movable into and out of protective relation with said duct inlet, said screen comprising a plurality of spaced flexible web portions and spaced parallel vane portions carried thereby, the web portions at opposite margins of the screen being slidably engageable with said tracking walls of the frame structure, said frame structure having a recess formed therein at one side of said duct for receiving said screen upon movement thereof along said tracking walls to uncover said inlet, endless cable means anchored in said screen and partly extending through said recess, and carrier means mounted in said frame structure adjacent said duct including an actuating roller operatively engaging said cable means for effecting movement of said screen either into protective relation with said duct inlet or into said recess, said cable means including yieldable means sufficiently elastic to absorb any impact forces tending to distort said screen in the event of collision thereof with a foreign object while disposed in the duct protecting position.

THOMAS J. COTTON, Jr.

REFERENCES CITED

The following references are of record in the file of this patent:

UNITED STATES PATENTS

| Number | Name | Date |
| --- | --- | --- |
| 251,483 | Stiles | Dec. 27, 1881 |
| 297,223 | Brandstaetter | Apr. 22, 1884 |
| 1,384,822 | Bruce | July 19, 1921 |